United States Patent [19]
Neumann et al.

[11] Patent Number: 5,912,665
[45] Date of Patent: Jun. 15, 1999

[54] METHOD AND APPARATUS FOR PHYSICALLY MANIFESTING COSTUME OBJECTS IN A FLEXIBLE MANNER, IN AN OBJECT-ORIENTED COMPUTER ENVIRONMENT

[75] Inventors: Erik Richard Neumann, Redwood City; Albert James Fenton, III, San Jose, both of Calif.

[73] Assignee: Object Technology Licensing Corp., Cupertino, Calif.

[21] Appl. No.: 08/887,767

[22] Filed: Jul. 3, 1997

Related U.S. Application Data

[63] Continuation of application No. 08/510,029, Aug. 1, 1995, abandoned, which is a continuation of application No. 08/040,654, Mar. 31, 1993, abandoned.

[51] Int. Cl.[6] ................................................ G06F 3/14
[52] U.S. Cl. ................................ 345/334; 395/683
[58] Field of Search .................................. 345/334, 335, 345/333, 339, 173, 949, 960, 956, 957, 346, 967; 395/683, 680

[56] References Cited

U.S. PATENT DOCUMENTS

| | | | |
|---|---|---|---|
| 5,001,697 | 3/1991 | Torres | 395/139 |
| 5,191,645 | 3/1993 | Carlucci et al. | 395/159 |
| 5,276,816 | 1/1994 | Cavendish et al. | 395/159 X |
| 5,287,447 | 2/1994 | Miller et al. | 395/159 X |
| 5,333,256 | 7/1994 | Green et al. | 395/159 |
| 5,345,550 | 9/1994 | Bloomfield | 395/161 X |
| 5,363,482 | 11/1994 | Victor et al. | 395/157 |
| 5,388,203 | 2/1995 | Kaneko | 395/159 |
| 5,388,264 | 2/1995 | Tobias, II et al. | 395/159 X |
| 5,416,900 | 5/1995 | Blanchard et al. | 395/155 |
| 5,544,302 | 8/1996 | Nguyen | 395/161 |
| 5,734,905 | 3/1998 | Oppenheim | 395/683 |

OTHER PUBLICATIONS

Hsia et al., "Construction and Manipulation of Dynamic Icons," Visual Languages, 1988 IEEE Workshop, 1988, pp. 78–83.

Hirakawa et al., "Interpretation of Icon Overlapping in Iconic Programming," Visual Languages, 1991 IEEE Workshop, 1991, pp. 254–259.

B.A. Myers, et al., "Garnet Comprehensive Support For Graphical, Highly Interactive User Interfaces", Computer, vol. 23, No. 11, Nov. 1, 1990, pp. 71–85.

Clarisse et al., "An Icon Manager in Lisp," IEEE Workshop on Languages for Automation, Jun. 1985, pp. 116–131.

Cassell, "Icon–It 2.0," MacWorld, Sep. 1990, pp. 243–244.

Tsuda et al., "IconicBrownser: An Iconic Retrieval System for Object–Oriented Databases," IEEE, 1989, pp. 130–136.

*Primary Examiner*—Matthew M. Kim
*Assistant Examiner*—Crescelle N. dela Torre
*Attorney, Agent, or Firm*—Kudirka & Jobse; James A. Ward

[57] ABSTRACT

A flexible system for changing the physical manifestation of an object in an object-oriented computer environment is provided. The object to be manifested (a "costume" object) is associated with a target object having a corresponding physical appearance. The costume object responds to requests that it physically manifest itself by transmitting a message to the target object requesting that the target object manifest itself, but also including parameter values describing the costume objects on-screen location or similar properties. In this manner, a costume object is capable of presenting itself wearing the target object's "costume" or appearance.

9 Claims, 6 Drawing Sheets

(1) TARGET_1: = NEW OVAL;                            350
(2) ADDACTOR CONDUCTOR TARGET_1;
(3) TARGET_2: = NEW BOX
(4) ADDACTOR CONDUCTOR TARGET_2;
(5) COST: = NEW COSTUMEACTOR;
(6) ADDACTOR CONDUCTOR COST;
(7) COST'S COSTUME: = TARGET_1;
(8) COST'S COSTUME: = TARGET_2;
(9) COST Y: = 200;
(10) COST'S COSTUME: = TARGET_1.

METHOD AND APPARATUS FOR PHYSICALLY MANIFESTING COSTUME OBJECTS IN A FLEXIBLE MANNER, IN AN OBJECT-ORIENTED COMPUTER ENVIRONMENT

This is a continuation of application Ser. No. 08/510,029 filed Aug. 1, 1995, now abandoned, which is a continuation of Ser. No. 08/040,654 filed Mar. 31, 1993, now abandoned.

BACKGROUND OF THE INVENTION

The present invention relates to a computer system running in an object oriented programming environment and more particularly to methods and means for associating objects to their presentation in the environment.

Authors of computer based multimedia presentations (titles) face the difficult task of creating scripts to control the objects in their title. These scripts, which are essentially a type of computer program, are needed to display objects having desired images, such as circles, rectangles, spreadsheets, etc. The writing of a script is frequently a complex and time consuming task that demands highly specialized skills. Typically, these skills are difficult to acquire and very few multimedia authors wish to spend the time to learn them.

Examples of multimedia scripting languages can be found in such computer program products as HyperCard, developed by Apple Computer, Inc., MacroMind Director, developed by MacroMedia Inc., and Authorware Professional from MacroMedia, Inc. These multimedia scripting languages require the multimedia author to learn all the intricacies of the scripting language and to develop scripts comprising several hundred lines of code to create desired presentations. This code is complex to develop and typically cannot be readily reused.

Further, these languages use a conventional, mostly non-object oriented approach to scripting. It is generally recognized that object oriented approaches have many advantages over non-object oriented approaches, such as the ability to easily reuse code and develop complex code in an efficient manner.

It is currently possible to associate images and sound to objects in prior art object oriented systems. For example, programming systems such as Smalltalk or C++ provide multiple inheritance classes which allow a "mixed in" class to add in methods for displaying images on the screen of a monitor to an existing (parent) class.

The object oriented approach of using multiple inheritance to display images allows for reuse of code to some extent, but there are still problems. For example, in order to mix in display methods, an author typically needs to create a new class in a programming environment, and needs to resolve conflicts for any methods that are defined by both the parent class and the "mix in" class.

The technique of multiple inheritance requires the author to (1) write a new class in order to use a certain display method and (2) have the knowledge and skill to resolve the conflicts between the classes. The use of this technique is typically found in programming environments involving compilers, linkers, and debuggers. As a result, this technique can only be learned and used after years of formal training. Thus, the technique of multiple inheritance is typically not available to a non-programmer author in an interactive real time environment where incremental experimentation allows for rapid learning and exploration.

Existing environments also do not provide a convenient mechanism for changing the appearance of an object over time while the program is running. The new class always inherits from the mix in class. In addition, the environment can result in a proliferation of confusing and complex classes.

SUMMARY OF THE INVENTION

Broadly stated, the invention provides a flexible system for changing the physical presentation of an object in an object oriented programming environment. The system includes presentation means (e.g., monitors in the case of visual images or speakers in the case of audio signals) for presenting physical manifestations of objects. The system comprises a first target object containing a first presentation method having a universal interface protocol. The first presentation method presents a first physical manifestation (e.g., a certain image or sound) on the presentation means. This universal interface protocol allows the first presentation method to be accessible by other objects capable of communicating using the universal interface protocol. The system also contains a costume object which contains means for communicating with the first target object using the universal interface protocol. The costume object causes the first presentation method to present the first physical manifestation of the costume object—e.g., the costume causes the target object to display itself at the costume object's position on the screen, in effect displaying the costume object wearing the costume of the target object.

If the user desires that the costume object present a second physical manifestation (e.g., another image), the user associates it with a second target object. The second target object contains a second presentation method having the universal interface protocol. The second presentation method presents the second physical manifestation on the presentation means. The costume object then causes the second target object to present the costume object's second physical manifestation on the presentation means. As a result, it is possible for the costume object to have different physical manifestations.

In this manner, a costume object is capable of presenting itself as a target object, i.e., drawing itself on the screen using the target object's appearance. The costume object accomplishes this feat by requesting that the target object presents itself using one or more properties of the costume object. For example, the target object might draw itself at the costume object's current position on the screen, in effect causing the costume object to change its appearance.

Therefore, it is an object of the present invention to provide a simple yet powerful programming environment to multimedia authors.

It is a further object of the present invention to reduce the number of classes in an object oriented programming environment.

If is yet another object of the present invention to avoid multiple inheritance in the creation of classes and objects.

It is also an object of the present invention to allow multimedia authors to easily change the presentation format of an object.

Other objects, advantages, and features of the present invention will become apparent to those skilled in the art from the following specification when taken in conjunction with the accompanying drawings.

DETAILED DESCRIPTION OF PREFERRED EMBODIMENTS

Figure 1:
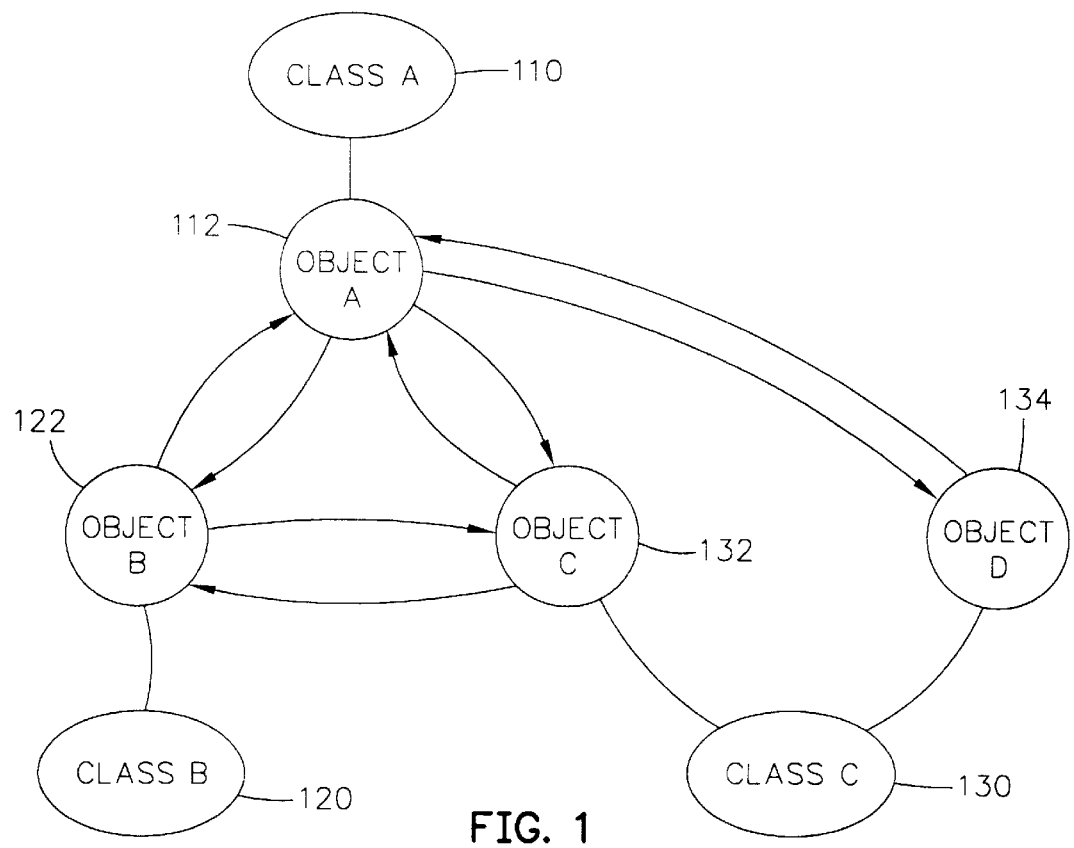
FIG. 1 is a drawing showing an object communication system according to the present invention.

FIG. 1 illustrates an object communications system in accordance with the present invention. The system facilitates communication among objects in an object-oriented programming environment. The system of FIG. 1 comprises three classes, class A, class B, and class C, shown as reference numerals 110, 120, and 130, respectively. Each class may consist of an enumerated number of objects which are derived from the class. For example, FIG. 1 also shows an object A derived from class A, an object B derived from class B, an object C derived from class C, and an object D derived from class C; these objects are shown in FIG. 1 as reference numerals 112, 122, 132, and 134, respectively. Each object has the ability to send and receive certain messages in accordance with predefined capabilities of such object. Any particular object of a class may be in communications with one or more objects derived from the same or another class. Direct communication between objects derived from classes A and B enables object A derived from class A to affect the behavior of object B derived from class B by sending it a specific message. A typical message may be a request for data or information, a transmission of data or information, a query as to the other object's ability to perform certain methods, or an instruction to execute certain operations, to undertake certain actions, or to perform certain functions.

In a preferred embodiment, one of the objects, for example, object A, which is derived from Class A, is a conductor object. The conductor object contains a list of objects that are active and coordinates their use of shared resources, such as a monitor, user events and CPU cycles. The conductor is responsible for the smooth updating of the screen of the monitor by compositing the objects on the screen in an efficient way. Objects of another class, for example, class B, are costume objects. These costume objects use the methods of the objects of other classes, e.g., object C of Class C, for graphic display. The objects which perform the graphic display function for costume objects are target objects. Each target object preferably displays a unique image.

Figure 2A:
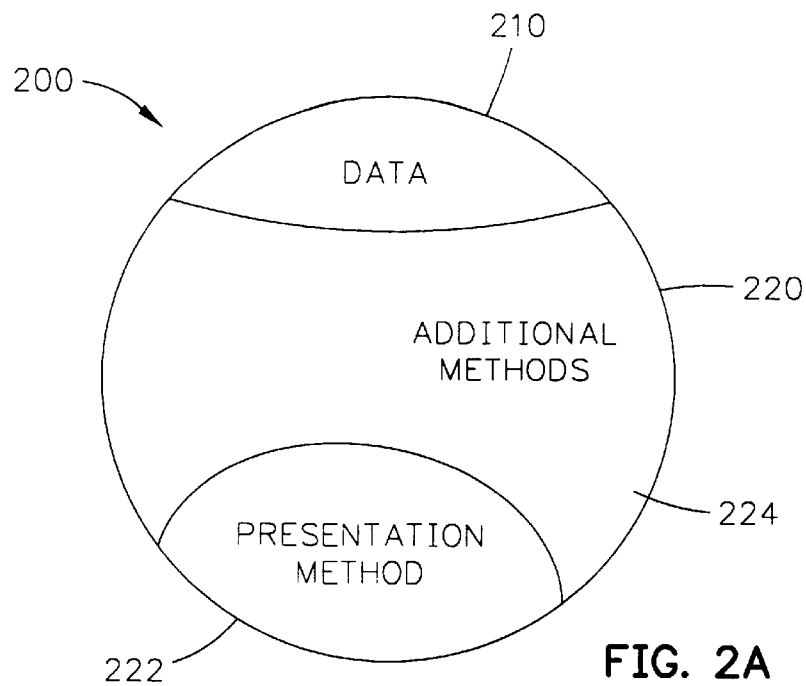
FIG. 2A is a drawing showing the structure of a target object according to the present invention.

FIG. 2A shows the structure of a target object 200 of the present invention consisting of two components: a data field 210 and a methods module 220. Data field 210 contains data that is accessible by methods module 220. Data field 210 of object 200 is private to object 200, i.e., it is accessible only by methods module 220 of object 200. One object may access the data field of another object by sending a message requesting that object to execute one or more of its methods to access its private data.

Methods module 220 contains a presentation method 222 and a set of additional methods 224. Presentation method 222 has a universal interface protocol such that many or all of the costume objects in the object communication system can invoke presentation method 222. The costume object invokes presentation method 222 of target object 200, altering one or more characteristics of the target object (e.g., its location) to match the characteristics of the costume object. Presentation method 222 then presents a physical manifestation (e.g., playing the target object's sound or displaying the target object's appearance at the costume object's location). Examples of images presented by various presentation methods are a shape, a bitmap image, a spreadsheet, a memo, or other images. Target object 200 may also use presentation method 222 to display itself (i.e., at its own location).

It should be noted that, in general, the costume object must change the target object's characteristic back to its original position. If the target object, however, is only used by this costume object (and thus not on the conductor's list), then its characteristics need not be reset after each invocation of the presentation method.

The additional methods 224 of target object 200 are those methods which are not of concern to costume objects, i.e., methods which do not relate to the presentation of images, sounds, etc. These additional methods are conventional methods, well known in the art, and are not part of the present invention.

Figure 2B:
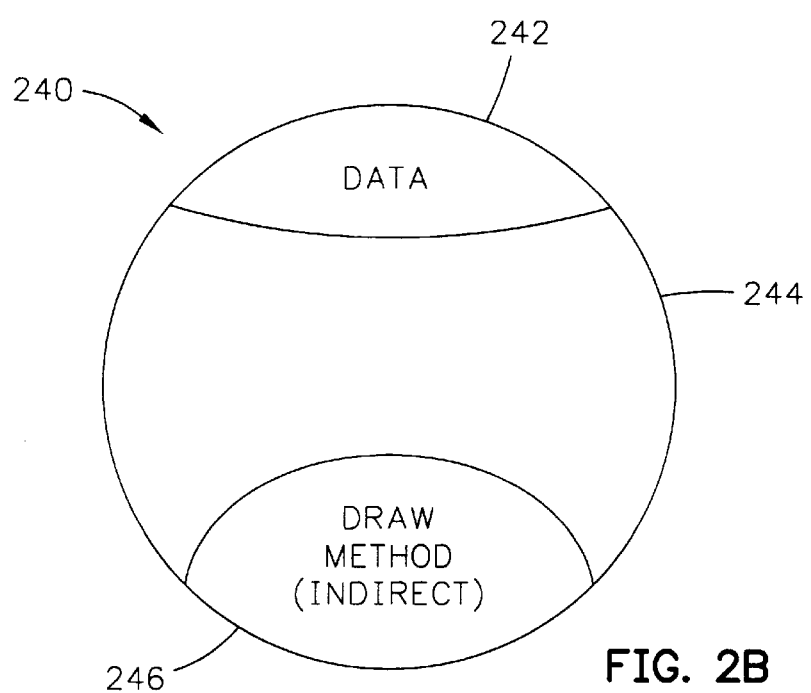
FIG. 2B is a drawing showing the structure of a costume object according to the present invention.

FIG. 2B shows the structure of a costume object 240 of the present invention. Costume objects also contain a data field 242 and a methods module 244. In this embodiment, the methods module contains a draw method 246 which does not directly draw an image by itself, i.e., there is no code in draw method 246 which actually draws an image. Draw method 246 merely invokes the presentation method of an associated target object (identified in data field 242, along with the position of costume object 240) in response to a draw message sent by the conductor object (for example, object A of FIG. 1) during the compositing process. Thus, if a costume object desires to display itself as a corresponding target object, it merely needs to invoke the presentation method of that target object and passes its current position on the screen as a parameter.

Figures 2C, 4:
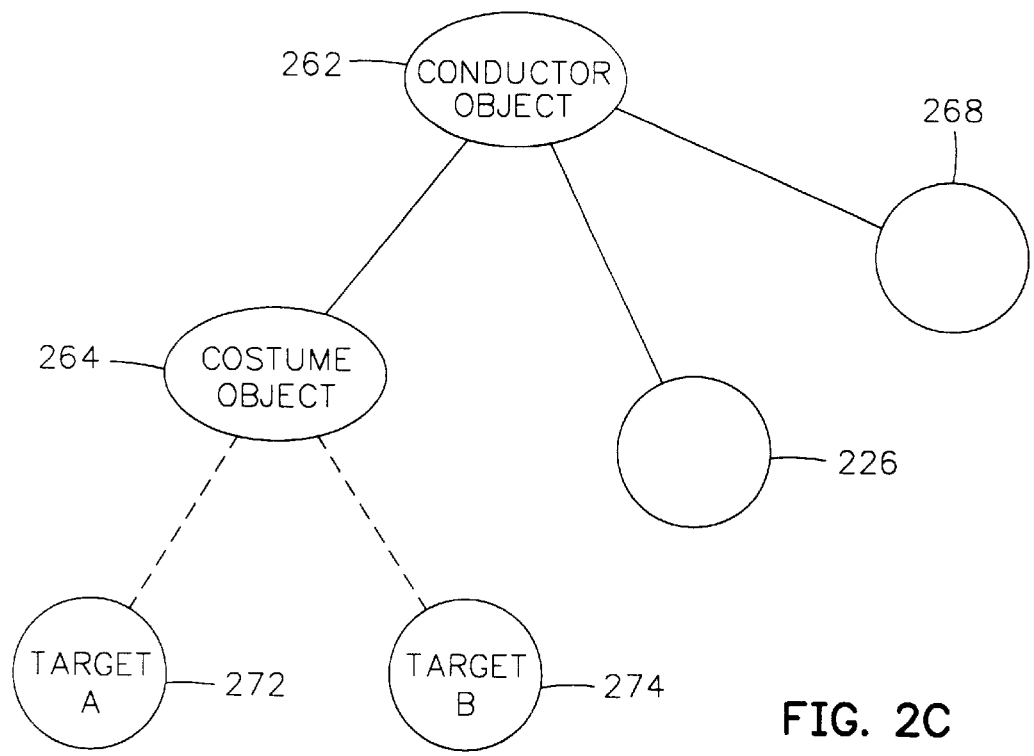
FIG. 2C is a drawing showing the interaction between a conductor object, a costume object, and target objects in accordance with the present invention.
FIG. 4 shows an exemplary program illustrating the use of target and behavior objects according to the present invention.

FIG. 2C illustrates the interaction between a conductor object 262, a costume object 264, two objects 266 and 268, and two target objects, A (272) and B (274). Costume object 264 and objects 266 and 268 are on the list of active objects maintained by conductor object 262. As a result, conductor object 262 can invoke the draw methods of these objects. However, target objects A and B are not on the list of conductor object 262. Consequently, conductor object 262 does not directly invoke the presentation methods of target objects A and B. Since target objects A and B each contains a presentation method having the universal interface protocol, the presentation methods of these two target objects could be used by costume object 264. Even though costume object 264 can associate with only one target object at a time, costume object 264 can change its association to a different target object. Thus, costume object 264 can display different images by invoking the presentation method of different target objects.

It should be pointed out that a target object can also be an active object—i.e., an object on the conductor's list capable of receiving user events, etc. Thus, active object 266 could be a target object (i.e., it contains a presentation method having a universal interface protocol). In this case, object 266 is itself displayed at its own location (using its own presentation method) while that same presentation method could be used by costume object 264 for displaying the same image at the costume object's location (i.e., displaying the costume object with the target object's appearance).

Figure 3:
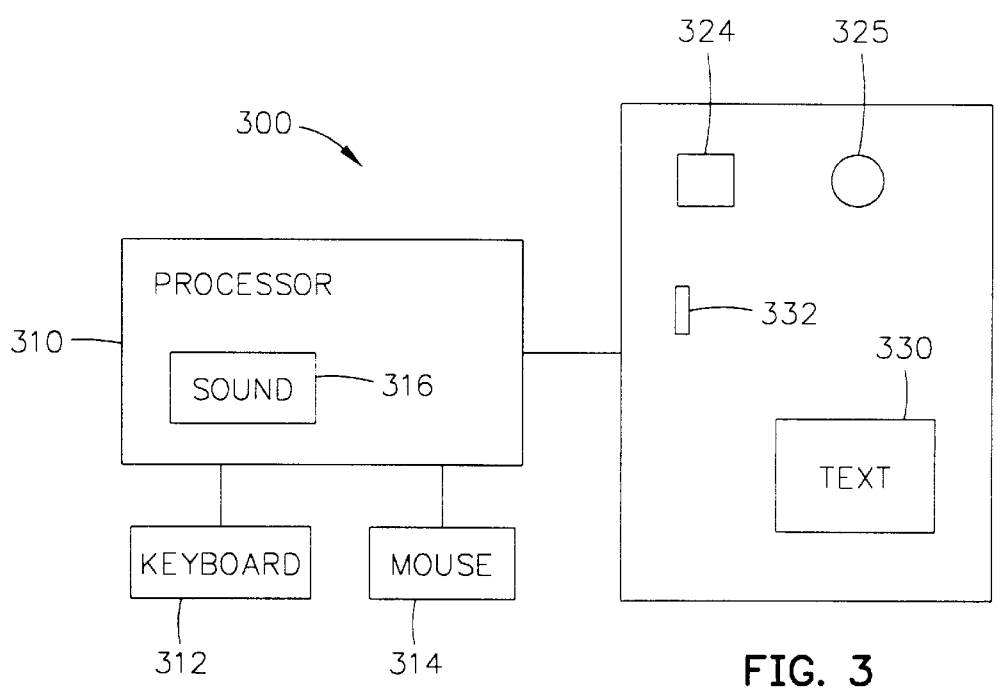
FIG. 3 is a drawing of a computer system containing an object oriented programming environment of the present invention.

A discussion of a specific application of the object communications system of the present invention as used in a multimedia environment will further clarify the embodiments of the present invention. FIG. 3 is a drawing showing a computer system 300 comprising a processor unit 310, a keyboard 312, a pointing device (such as a mouse 314), and a monitor 320. Processor unit 310 preferably contains a central processor unit, memory, and other components for performing digital operations. Processor unit 310 further contains a sound unit 316 for generating audio outputs in a multimedia environment. Different peripheral devices, such as video and external media systems (not shown), can also be advantageously coupled to processor unit 310.

Monitor 320 may display a plurality of objects, such as a square object 324 and an oval object 325. A text window 330 may also co-exist with these objects. In the preferred embodiment, text window 330 could be a scripter window for a user to enter a script using a scripting language. FIG. 3 also shows a cursor 332 being displayed on monitor 320. The movement of cursor 332 is preferably controlled by mouse 314.

FIG. 4 shows an exemplary script 350, written in pseudo code form, for demonstrating the creation and use of a costume object. Each statement of script 350 contains a line number (located at the left hand side of the corresponding statement) for easy identification. Script 350 creates two target objects: (1) an oval object (designated in script 350 as "TARGET_1"), and (2) a box (rectangular) object (designated in script 350 as "TARGET_2"). Script 350 also creates a costume object, designated as "COST." The shape of costume object "COST" can be changed easily from an oval to a rectangle, or vice-versa, by associating COST either with TARGET_1 or TARGET_2.

The writing and execution of script 350 in an interactive environment is illustrated in FIGS. 5A–5I. These drawings show the images displayed on the screen of monitor 320 as script 350 is executing. After the first line of script 350, i.e., "TARGET_1 :=NEW OVAL," is entered by a user in scripter window 330, a target object is created. However, the image of TARGET_1 object is not shown on the screen of monitor 320 because it is not added to the list of the conductor object.

After the second line of script 350, i.e., "ADDACTOR CONDUCTOR TARGET_1," is entered by the user in scripter window 330, TARGET_1 object is added to the list of the conductor object. This target object (shown in FIG. 5A as an oval object 374) contains a presentation method which draws an oval on the screen of monitor 320. As a result, an oval appears at a default position on the screen monitor 320. The presentation method of oval object 374 contains the universal interface protocol, described above. Consequently, the presentation method of oval object 374 can be used by any costume object. As pointed out above, target objects do not have to be themselves displayed. The purpose of performing this step is to provide a better view of the objects of the present invention.

Figure 5A:
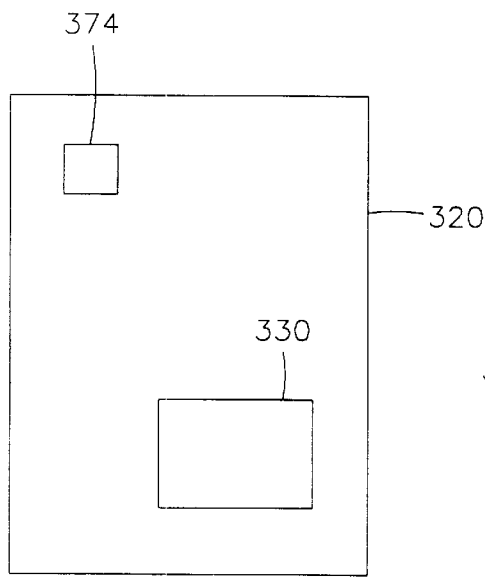
FIGS. 5A–5I show the screen of a monitor showing the different stages in the execution of the exemplary program of FIG. 4.
Figure 5B:
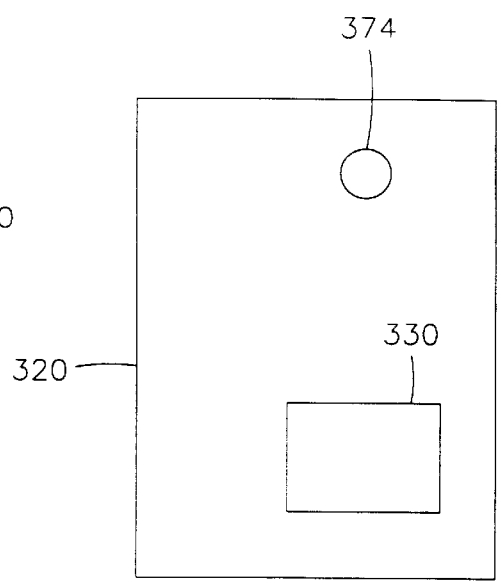
Figure 5C:
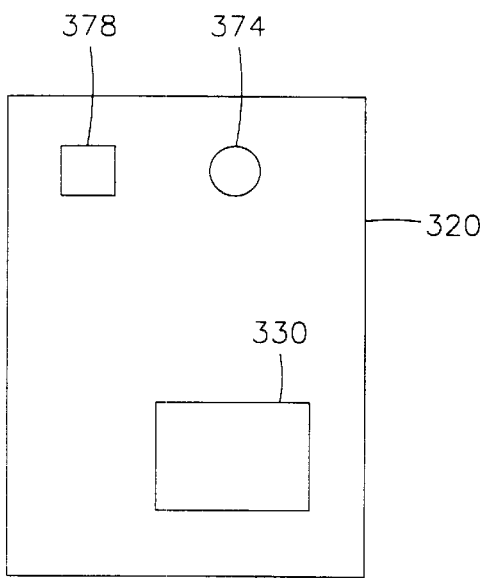

The user can position cursor 332 on oval object 374 and use mouse 314 to drag oval object 374 to a position on monitor 320 which does not overlap scripter window 330 (see FIG. 5B). The purpose of performing this drag step is to provide a better view of the objects of the present invention, as will be demonstrated below.

After the third line of script 350, i.e., "TARGET_2 :=NEW BOX," is entered by the user into scripter window 330, another target object is created. At this point in time, TARGET_2 object is not displayed because it is not on the list of the conductor object.

After the fourth line of script 350, i.e., "ADDACTOR CONDUCTOR TARGET_2," is entered by the user into scripter window 330, TARGET_2 object is added to the list of the conductor object. This target object (shown in FIG. 5C as a box object 378) contains a presentation method which draws a rectangular box on the screen of monitor 320. As a result, a box appears at the default position on the screen monitor 320. The presentation method of box object 378 contains the universal interface protocol, described above. Consequently, the presentation method of box object 378 can be used by any costume object. As pointed out above, target objects do not have to be themselves displayed. Again, the purpose of performing this step is to provide a better view of the objects of the present invention.

Figure 5D:
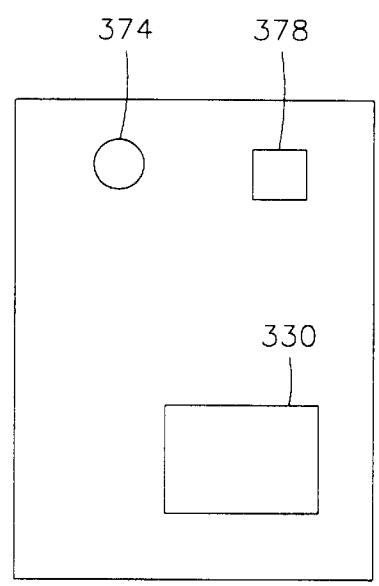

The user can position cursor 332 on box object 378 and uses mouse 314 to drag box object 378 to a position which does not overlap either scripter window 330 or oval object 374 (see FIG. 5D). Again, the purpose of performing this drag step is to provide a better view of the objects of the present invention.

The rest of script 350 relates to the creation and manipulation of a costume object. After the fifth line of script 350, i.e., "COST :=NEW COSTUMEACTOR," is entered by the user into scripter window 330, a costume object named "COST" is created. The sixth line of script 350, i.e., "ADDACTOR CONDUCTOR COST" instructs the conductor to add costume object COST to its list of active objects. At this point in time, there is no physical image of COST on the screen of monitor 320 because the draw method of COST is not able to directly draw an image.

After the seventh line of script 350, i.e., "COST'S COSTUME :=TARGET_1," is entered by the user into scripter window 330, costume actor COST is associated with TARGET_1 object. When the conductor object invokes the draw method of COST object, COST object in turn sends a message to oval object 374 (i.e., TARGET_1 object) to invoke its presentation method.

In the preferred embodiment, prior to sending the presentation message to TARGET_1, the COST object gets and stores the current position of the TARGET_1 object. It then sets the position of the TARGET_1 object to its own current position. After invoking the presentation method of TARGET_1, the COST object restores TARGET_1's original position.

Figure 5E:
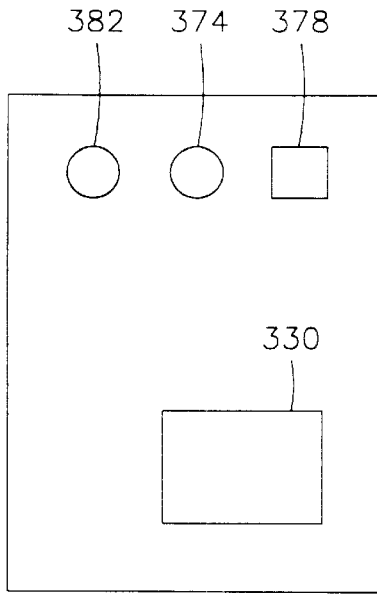
Figure 5F:
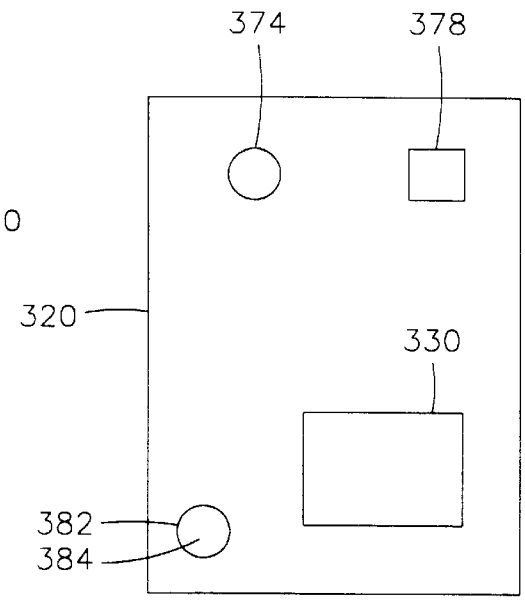
Figure 5G:
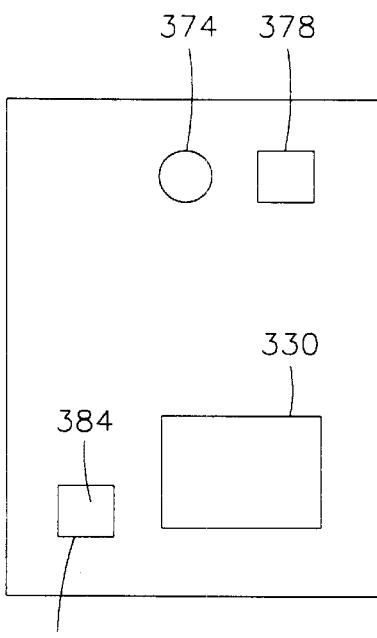

Since the presentation method of TARGET_1 draws an oval, COST now appears as an oval 382 at the default position (see FIG. 5E). The user can position cursor 332 on oval 382 and use mouse 314 to drag oval 382 to a new position 384 which does not overlap the other objects (see FIG. 5F). Again, the purpose of performing this drag step is to provide a better view of the objects of the present invention.

After the eighth line of script 350, i.e., "COST'S COSTUME :=TARGET_2," is entered by the user into scripter window 330, the conductor object causes COST to send a message to box object 378 (i.e., TARGET_2 object) to invoke its presentation method. Since the presentation method of TARGET_2 draws a box, COST now appears as a box 386 at position 384 (see FIG. 5G).

Figure 5H:
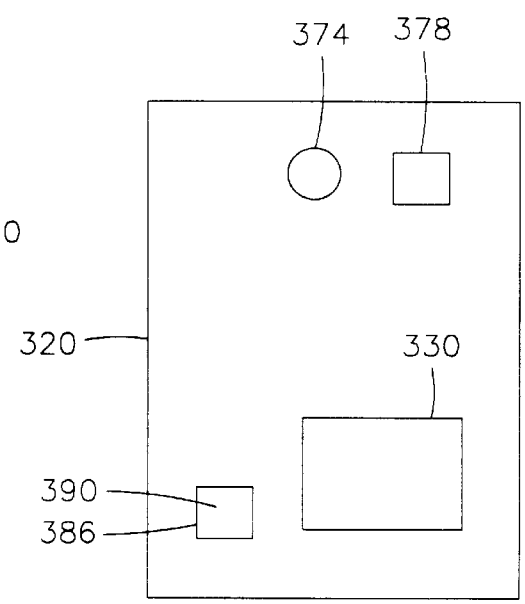
Figure 5I:
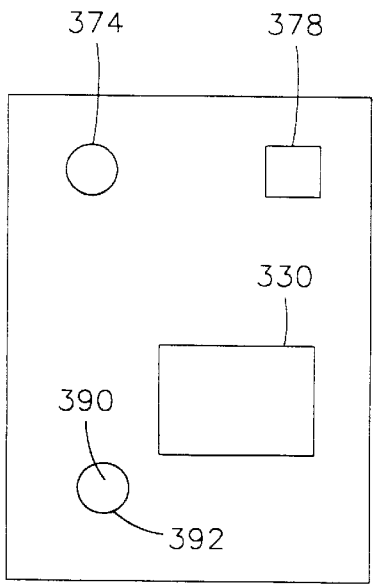

The ninth line of script 350, i.e., "COST Y :=200," moves the COST object to a new position 390 which is located directly above position 384 (see FIG. 5H). After the tenth line of script 350, i.e., "COST'S COSTUME :=TARGET_1," is entered by the user into scripter window 330, the conductor object causes COST to send a message to oval object 374 (i.e., TARGET_1 object) to invoke its presentation method. Since the presentation method of TARGET_1 draws an oval, COST now appears as an oval 392 at position 390 (see FIG. 5I).

Thus, the new target object appears at the same position (which makes sense because the COST object did not move). Note that this new target object appeared at the correct position only because the COST object either set the new target object's position to this position after associating the new target object, or because the COST object always (e.g., during its presentation method) sets and restores the position of its target object.

Figure 6A:
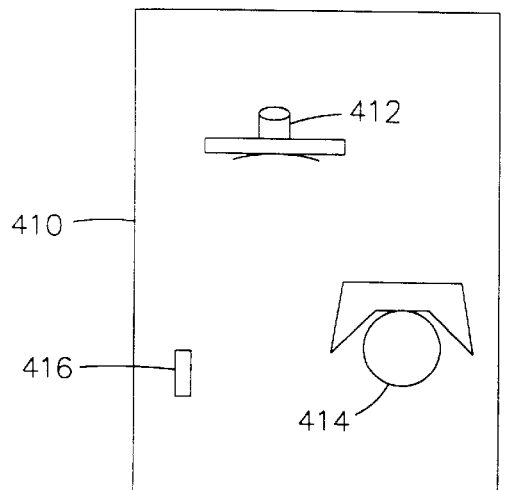
FIGS. 6A and 6B are drawings showing an application of the costume object of the present invention.
Figure 6B:
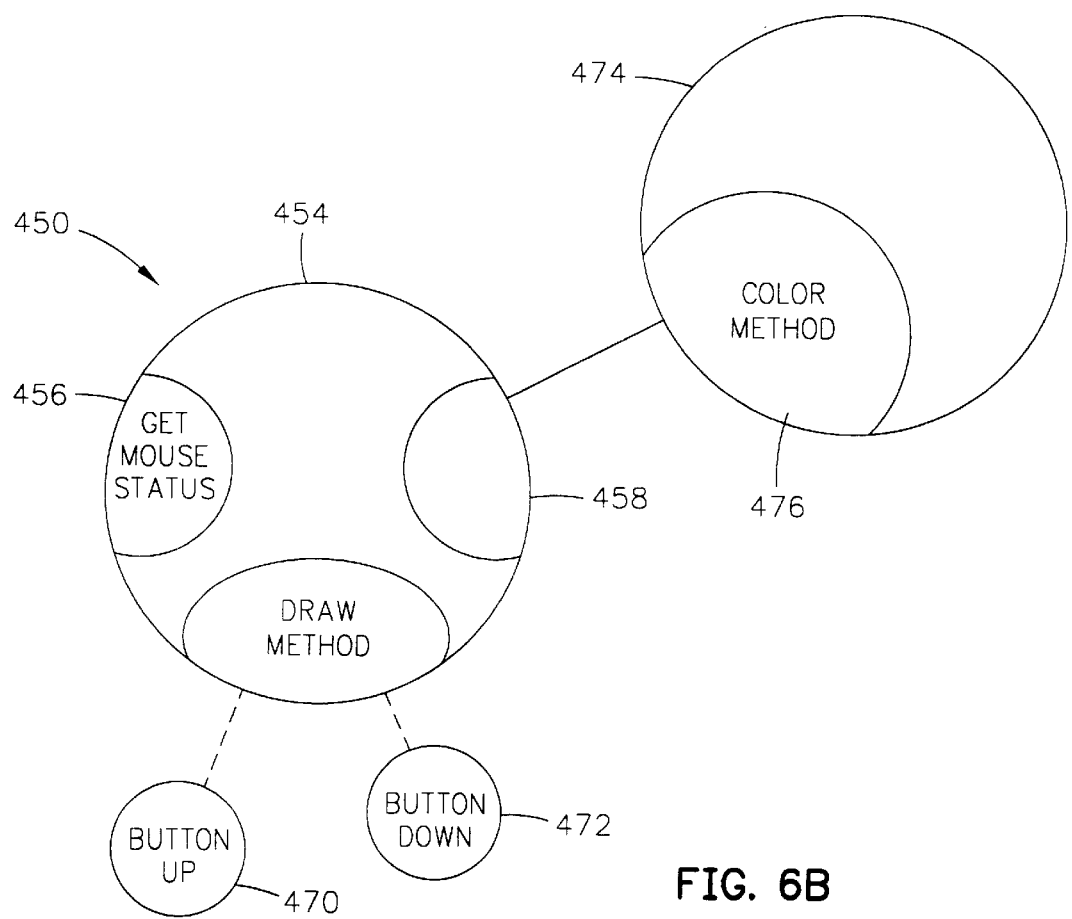

In addition to the draw method, costume objects may also contain a set of additional methods which are used for purposes other than invoking the presentation method. FIG. 6A shows a screen 410 of a monitor containing a button 412 located on a light bulb 414. A user can move a cursor 416 to the position of button 412 and click on a mouse 418. The color of light bulb 414 changes from yellow to black, and vice-versa, a short time after the clicking of mouse 418. FIG. 6B is a drawing showing one system 450 to implement the system of FIG. 6A using a specialization of the costume object of the present invention.

System 450 comprises a costume object 454 having a draw method for invoking the presentation methods of two target objects, a button up object 470 showing button 412 in a "up" position and a button down object 472 showing button 412 in a "down" position. Costume object 454 also contains a get-mouse-status (i.e., a "mouse down" handler) method 456 for receiving a mouse 418 event from the conductor (not shown). Costume object 454 also contains a method 458 to invoke the color method 476 of a light-bulb object 474.

As the user clicks on mouse 418, the status of the mouse is communicated to costume object 454. Costume object 454 displays itself either as button up or button down by invoking the presentation methods of button up object 470 or button down object 472. A short time after changing target objects, costume object 454 causes the color method 476 to change the color of light bulb 414.

It can be seen from the above example that the use of costume objects allows great flexibility in presenting the costume objects. Once a set of target objects is created, the presentation methods of these target objects can be used by many costume objects. There are certain advantages associated with using these presentation methods. First, the costume objects do not have to duplicate the presentation methods of the set of target objects. As a result, the efficiency of the system is improved. Second, the use of the same set of presentation methods provides consistency in the appearance of the costume objects.

Another significant flexibility provided by the use of costume object is the ability for the costume object to easily change its appearance. As can be seen in the above example, the multimedia authors only have to write one line of code to change the appearance of a costume object.

Costume objects overcome the deficiencies in prior art multimedia scripting systems because there is no complex code for the multimedia author to develop, and reuse is very easy. In addition, because the presentation methods can often be developed in a more efficient low-level computer language than the typical multimedia scripting language, the performance is better.

Costume objects overcome the deficiencies in traditional object oriented systems with multiple inheritance in several respects. First, a multimedia author does not have to create a new class with its attendant complexities. This keeps classes from proliferating, so that the environment is simpler for the author to comprehend and use, as compared to a multiple inheritance environment where a new class is made for every combination of display type. Second, the author does not have to decide how conflicts in methods are resolved, because both the costume object and the target object are able to have their full set of methods available, and the costume object can be written to correctly handle any conflicts.

For example, both the costume object and the target object can get "idle" messages from the system, it does not have to be a case of one or the other getting such an idle message. Another example is a costume object that gets a mousedown event, and then can decide to either process the mousedown on its own, or hand the mousedown event to its target object, or both. Third, costume objects can be "hooked up" to target objects at any time during run time. They can also be disconnected from target objects at run time. And multiple costume objects can be hooked up to a single target object, as the author sees fit. This gives the multimedia author the flexibility to experiment with different visual presentations for an object over time.

It should be understood that while the present invention has been specifically set forth and described with reference to the preferred embodiments, it will be readily appreciated by those skilled in the art that many changes in form and detail may be made without departing from the spirit and scope of the present invention as set forth in the appended claims.

What is claimed is:

1. A method for graphically displaying a costume object in a flexible manner, said method for use in an object-oriented, digital computer environment and comprising the following steps:

providing a plurality of classes of target objects, each one of the target objects including an internal definition of a corresponding display image;

creating a first target object belonging to a selected class of target objects;

associating the first target object with the costume object by giving the costume object an identifier for the first target object, said identifier serving to address the first target object when the costume object transmits messages to the first target object;

transmitting to the costume object a first message comprising a request to graphically display the costume object;

in response to the first message, transmitting to the first target object a second message comprising a request to graphically display the first target object and further comprising one or more parameter values describing the costume object; and in response to the second message, displaying the costume object using the display image defined by the first target object and further using the parameter values describing the costume object, using the digital computer.

2. The method of claim 1, further including the steps of:

creating a second target object belonging to a second selected class of target objects;

associating with the costume object the second target object in place of the first target object;

transmitting to the costume object a third message comprising a request to graphically display the costume object;

in response to the third message, transmitting to the second target object a fourth message comprising a request to graphically display the second target object, said fourth message further comprising the one or more parameter values describing the costume object; and in response to the fourth message, displaying the costume object using the display image defined by the second target object, and further using the parameter values describing the costume object, using the digital computer.

3. The method of claim 1, further including the steps of associating the first target object with a plurality of costume objects, and displaying each costume object in said plurality using the display image defined by the first target object and further using one or more parameter values describing each costume object.

4. The method of claim 1, where the one or more parameter values include an on-screen location for the costume object.

5. The method of claim 1, where the identifier is a reference to data pertaining to the first target object.

6. The method of claim 5, where the reference to data pertaining to the first target object comprises a pointer to data pertaining to the first target object.

7. A method for providing graphical display capability to a first class of object-oriented programming objects, said method comprising the following steps:

providing a second class of object-oriented programming objects, said second class having an object-oriented programming method for displaying a display image;

creating an object C belonging to said first class of objects;

creating a first object T1 belonging to said second class of objects;

associating object T1 with object C by giving object C an identifier for object T1, said identifier serving to address object T1 when object C transmits messages to object T1;

transmitting to object C a first message comprising a request to graphically display object C;

in response to the first message, transmitting to object T1 a second message comprising a request to graphically display object T1 and further comprising one or more parameter values describing object C; and in response to the second message, executing the method for displaying pertaining to the second class of objects so as to provide a graphical display for object C using the parameter values describing object C.

8. The method of claim 7 further including the steps of:

providing a third class of object-oriented programming objects, said third class having a second object-oriented programming method for displaying a second display image;

creating an object T2 belonging to said third class of objects;

associating object T2 with object C in place of object T1 by giving object C an identifier for object T2, said identifier serving to address object T2 when object C transmits messages to object T2;

transmitting to object C a third message comprising a request to graphically display object C;

in response to the third message, transmitting to object T2 a fourth message comprising a request to graphically display object T2, said fourth message further comprising the one or more parameter values describing object C; and in response to the fourth message, executing the second method for displaying so as to provide a graphical display for object C using the parameter values describing object C.

9. The method of claim 7 where said step of associating object T1 with object C comprises the step of assigning a pointer to data associated with object T1 to a field within object C.

* * * * *